US005738700A

United States Patent [19]

King

[11] Patent Number: 5,738,700
[45] Date of Patent: Apr. 14, 1998

[54] VEHICULAR AIR CLEANER ILLUMINATION FIXTURE

[76] Inventor: Gary L. King, 7532 Americur Ct., Lafayette, Ind. 47905

[21] Appl. No.: 591,745

[22] Filed: Jan. 25, 1996

[51] Int. Cl.$^6$ ..................................... B01D 46/00
[52] U.S. Cl. .................. 55/385.3; 55/DIG. 28; 206/223; 206/573; 362/83.3; 362/96
[58] Field of Search ............................ 55/385.1, 385.3, 55/DIG. 28; 123/198 E; 454/158; 362/96, 83.3, 234; 206/223, 573

[56] References Cited

U.S. PATENT DOCUMENTS

| | | | |
|---|---|---|---|
| 4,333,750 | 6/1982 | Helmus et al. | 55/385.3 |
| 4,439,816 | 3/1984 | Litchfield | 362/96 |
| 4,461,205 | 7/1984 | Shuler | 55/484 |
| 4,750,093 | 6/1988 | Bals et al. | 55/385.3 |
| 4,916,591 | 4/1990 | Schiele | 362/96 |
| 5,313,375 | 5/1994 | Jones | 362/96 |
| 5,422,795 | 6/1995 | Liu | 362/96 |

*Primary Examiner*—Duane S. Smith
*Attorney, Agent, or Firm*—Varnum, Riddering, Schmidt & Howlett LLP

[57] ABSTRACT

An illumination fixture (10) for a vehicular air cleaner housing (14), which is arranged and configured to position the fixture in the interior (13) of the housing's intake section (27). The illumination fixture is also arranged and configured to illuminate through a screen (20) of the intake section the exterior (41) of the housing with a source of illumination (16). The illumination fixture includes a panel (11) having an outer circumference (12) configured to pass through the interior (13) of the intake section. The panel includes one or more apertures each in which a source of illumination is positioned. Diametrically opposed mounting bracket attachment sites are also positioned in the panel to which fasteners are positioned for attaching mounting brackets to the panel. Mounting brackets (17) each include a panel attachment site (18) for attachment to the panel and an intake section attachment site (19) for attachment to the intake section. The panel and mounting bracket are positioned in the interior of the intake section so as to recess the illumination fixture in the top end cap of the air cleaner and produce a glowing light effect by the use of indirect light passing through the screen of the intake section to the exterior of the housing. The illumination fixture including the panel, mounting brackets, sources of illumination and fasteners are provided in a see-through package (26) for easy viewing and inspection by the consumer.

20 Claims, 9 Drawing Sheets

VEHICULAR AIR CLEANER ILLUMINATION FIXTURE

TECHNICAL FIELD

This invention relates generally to illumination fixtures and, in particular, to an illumination fixture for the air cleaner of a vehicle.

BACKGROUND OF THE INVENTION

Lights and illumination fixtures are utilized on vehicles for a variety of purposes such as illuminating the road at night or in limited visibility conditions. Vehicular lights and fixtures are also utilized to mark or identify various sections of a vehicle. Red and yellow marker lights are used on the side of a vehicle to indicate the respective rear and front ends of the vehicle to others approaching the vehicle from either side. Yellow and red marker lights are also used to indicate the height of a cab or trailer. Turn and stop lights are used to indicate when a vehicle is turning or braking.

More recently, lights are being used to decorate or customize a vehicle to meet the individual desires or tastes of the owners and drivers. Many common carriers are using lights and fixtures to identify their company's name, logo, or trademark. Most recently, owners of semi-trailer trucks are uniquely placing individual lights or combinations of lights all over their vehicles in order to distinctly decorate them. These attempts commonly involve positioning individual lights or strips of lights at various doors, panels, steps, handles, and the like.

However, what is needed are new and distinctive means of decorating or customizing vehicles with illumination devices or fixtures. These illumination fixtures or devices should not only enhance the appearance of the vehicle, but also provide additional safety enhancements to the vehicle.

SUMMARY OF THE INVENTION

The foregoing problems are solved and a technical advantage is achieved in an illustrative vehicular air cleaner illumination fixture for illuminating the exterior of an air cleaner housing through the intake section thereof with a source of illumination. The illumination fixture is advantageously positioned in the interior of the intake section of a vehicular air cleaner housing to produce a glowing light effect or indirect lighting, which reduces, if not eliminates, direct and glaring light from entering the eyes of a viewer. The illumination fixture comprises a panel with an outer circumference configured to pass through the interior of the intake section of the vehicular air cleaner housing. The fixture also includes a mounting bracket for mounting the panel in the interior of the intake section to create the desired glowing light effect. The panel and bracket include attachment sites for affixing the panel to the mounting bracket and the mounting bracket to the intake section of the air cleaner.

In one aspect, the panel comprises a circular plate in which one or more apertures are formed for positioning a source of illumination. Depending on the type and shape of the air cleaner housing in which the fixture is to be mounted, the mounting brackets include one or more bends with appropriate bend angles to position and recess the fixture in the top, end cap of the air cleaner. The panel, mounting brackets, and illumination sources are contained in a package for easy viewing and inspection by the consumer.

A vehicular air cleaner illumination system includes the vehicular air cleaner housing with the aforementioned illumination fixture positioned in the interior of the housing. To produce the desired glowing light effect, the panel and mounting brackets of the fixture are positioned within the intake section of the air cleaner housing and recessed in the top end cap thereof. The brackets are affixed to the intake screen of the housing, thus positioning and recessing the panel through the open end of the top end cap.

The shape of the panel is also configured to pass into the interior of the intake section such as through a small opening at one end thereof. The mounting brackets and fasteners are then affixed to the panel and to the intake screen, thereby positioning and recessing the panel in the interior of the top end cap.

DETAILED DESCRIPTION

Figure 1:
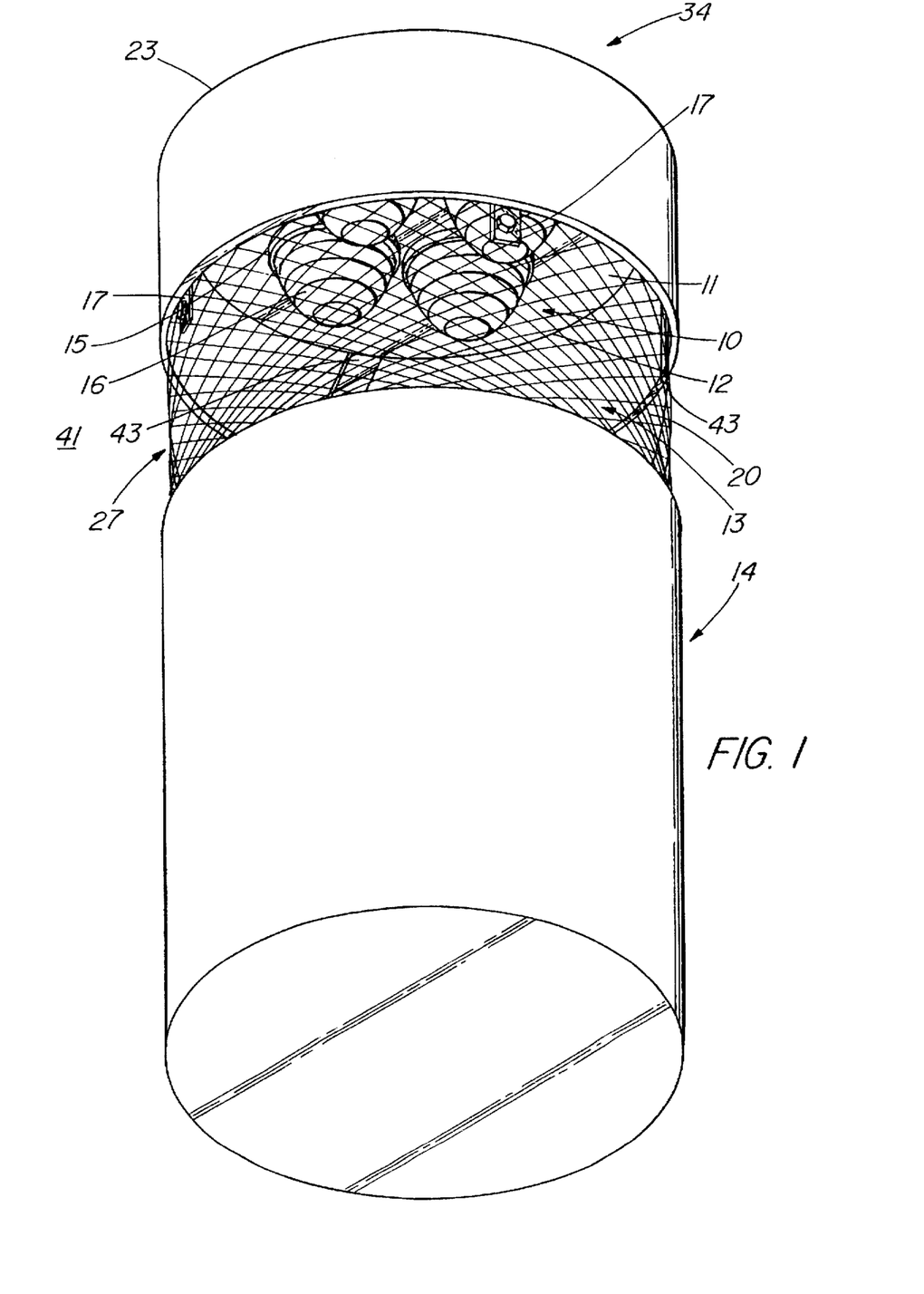
FIG. 1 depicts a pictorial view of the present invention positioned in the interior of a vehicular air cleaner.

FIG. 1 depicts an illustrative embodiment of a vehicular air cleaner illumination system 34 including an air cleaner housing 14 and an illumination fixture 10 with one or more sources of illumination 16 positioned in intake section 27 of the air cleaner housing so as to illuminate exterior 41 of the housing. The illumination fixture includes a panel 11 having an outer circumference 12 configured to pass through interior 13 of the intake section. The vehicular air cleaner illumination fixture also includes one or more brackets 17 and one or more seconds 43 of the brackets 17. The mounting brackets and the panel with a source of illumination positioned thereon are arranged and configured to position the panel in interior 13 of the intake section so as to illuminate exterior 41 of the housing. The panel includes one or more apertures 15 in which a source of illumination 16 is individually positioned. Preferably, the panel with one or more illumination sources positioned thereon is positioned in the interior of the intake section 27 so that the illumination sources are barely visible through screen 20 of the intake section. As a result, the energized illumination sources emit light through the screen of the intake section creating a glowing light effect. Positioning the vehicular air cleaner illumination fixture in the interior of the intake section of a vehicular air cleaner housing in this manner provides for an unusual and pleasingly aesthetic lighting effect. The illumination sources are recessed into top end cap 23 of the air cleaner housing which prevents direct and glaring light from entering the eyes of a viewer. This is particularly noteworthy to oncoming drivers coming into view of a vehicle having such an illuminated air cleaner housing.

Figure 2:
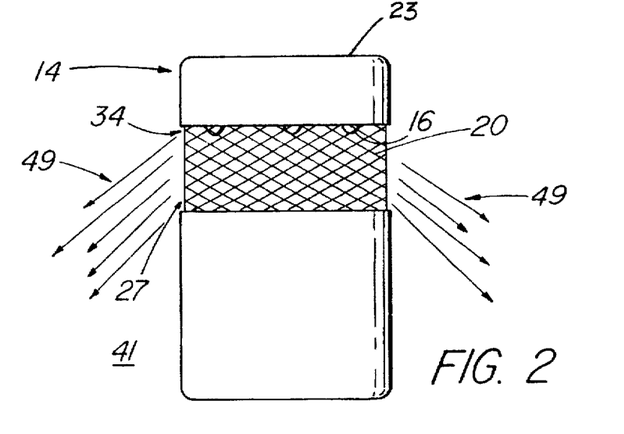
FIG. 2 depicts a side view of the present invention with light being directed in a downward direction and producing a glowing light effect from a vehicular air cleaner.

FIG. 2 depicts a side view of vehicular air cleaner illumination system 34 of FIG. 1 with light rays 49 being directed in a downward direction through screen 20 of intake section 27 of housing 14. The light rays are directed in a downward direction so as to illuminate exterior 41 of the air cleaner housing and produce an unusual lighting effect with the air cleaner housing. Light from the intake section of the vehicular air cleaner housing not only protects personnel coming in close proximity with the housing, but the recessed fixture does not interrupt or unduly restrict the flow of air to, for example, the engine of which air is being supplied. This vehicular air cleaner illumination system also provides a new and unique way of customizing and personalizing a vehicle to which air cleaner housing 14 is attached. As previously suggested, illumination sources 16 are recessed into top end cap 23 of the air cleaner housing so as to be barely visible and prevent direct and glaring light from entering the eyes of the viewer. This unique positioning causes light rays 49 to be emitted in an downward direction. This indirect lighting scheme produces a glowing light effect with the air cleaner housing.

This glowing light effect can be further modified dependent on the shape of the vehicular air cleaner housing in which the illumination fixture is mounted. By way of example, diesel trucks utilized by many common carriers utilize a variety of name brand air cleaners. One such name brand cleaner is the VORTOX air cleaner, which has a generally cylindrical configuration with an outside diameter of approximately 15 inches. Similarly shaped air cleaners are also manufactured by the Farr, PETERBILT and Kenworth companies. A Peterbilt after market VORTOX style air cleaner is also available with a generally cylindrical configuration with a smaller outer diameter of approximately 13 inches. Another vehicular air cleaner is manufactured by the DONALDSON company with the intake section having a flared top end cap, also commonly referred to as a "top hat", and a necked down portion at the bottom end of the intake section, which mounts on the lower half of the air cleaner housing. Still another vehicular air cleaner similar to the DONALDSON configuration is manufactured by the Nelson company. The NELSON air cleaner also has a flared top end cap with a necked down portion at the bottom end of the intake section. The dimensions of the intake section and necked down portion of both of these air cleaner housings differ in size and, accordingly, require different types of lighting panels and mounting brackets to accommodate positioning and mounting them in the interior of the intake section. Still yet another commercially available vehicular air cleaner is a variation of the 13 inch VORTOX air cleaner, which is commonly used on trucks other than the Peterbilt truck. This particular air cleaner has a tapered intake screen, which is mounted in the interior of the top end cap of the air cleaner and tapers down to a small diameter neck, which mounts on the bottom portion of the air cleaners. Vehicular air cleaner illumination fixtures necessary for each of these different air cleaner housings to form each of the unique vehicular air cleaner illumination systems will be described hereinafter.

Figure 3:
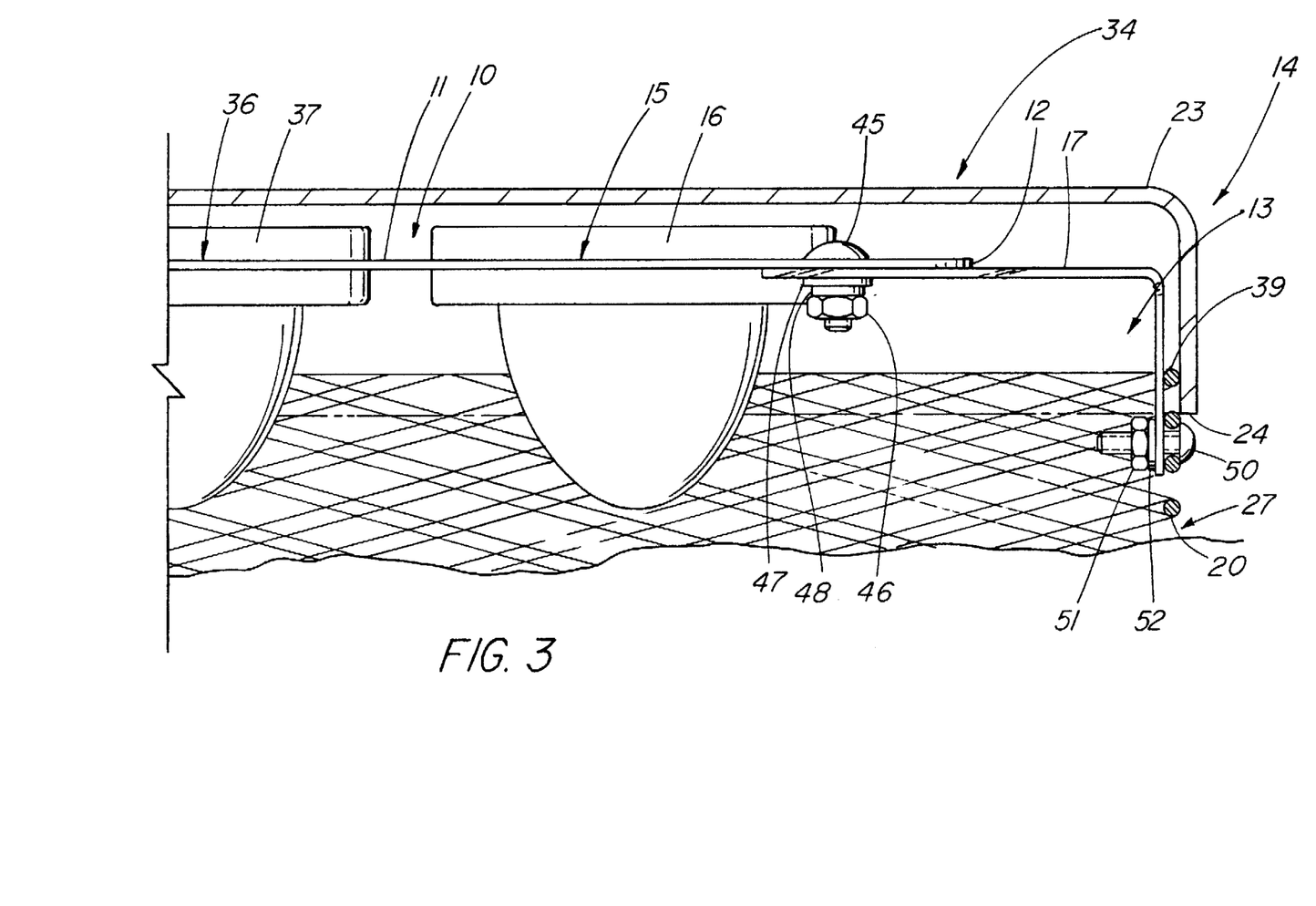
FIG. 3 depicts a partially sectioned and enlarged side view of a first preferred embodiment of the present invention of FIG. 1 for a 15 inch VORTOX vehicular air cleaner.

FIG. 3 depicts an enlarged, partially sectioned side view of a first preferred embodiment of the vehicular air cleaner illumination system 34 of FIG. 1 and, in particular, illumination fixture 10 positioned in interior 13 of intake section 27 of a VORTOX air cleaner housing 14. The VORTOX air cleaner housing has a generally cylindrical construction with an outside diameter of approximately 15 inches. The intake section of the VORTOX housing is also cylindrical in shape with a cylindrically shaped screen 20. Top end cap 23 is also cylindrically shaped and closed at the top end thereof and fixedly attached at bottom end 24 in a well-known manner to top open end 39 of intake screen 20.

Figures 4, 5, 7:
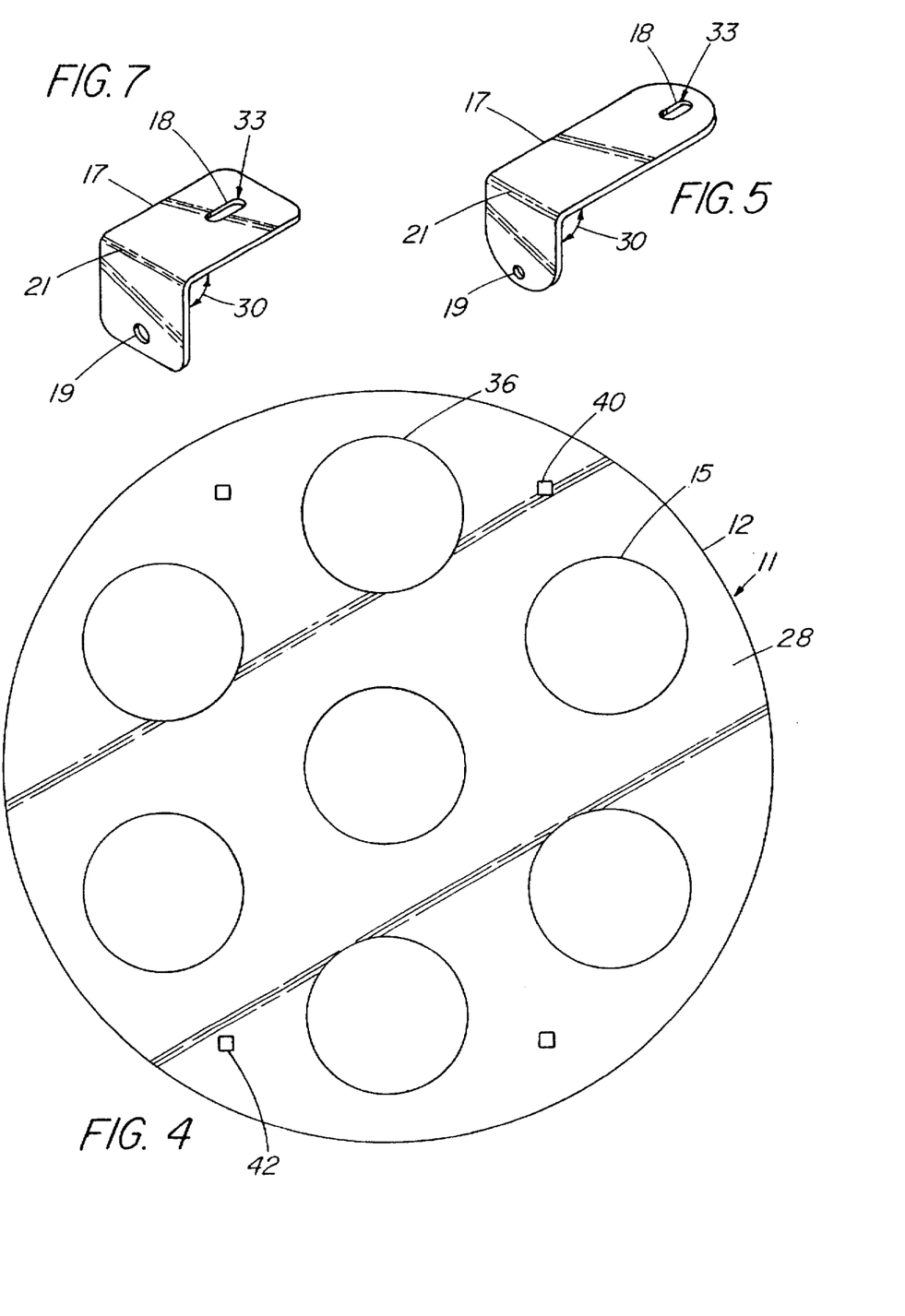
FIG. 4 depicts a top view of the panel of the present invention for the embodiment of FIG. 3.
FIG. 5 depicts a pictorial view of a mounting bracket of the present invention for the embodiment of FIG. 3.
FIG. 7 depicts a pictorial view of the mounting bracket of the present invention for the second embodiment of FIG. 6.

FIG. 4 depicts a top view of panel 11 of illumination fixture 10 of FIG. 3 for a 15 inch VORTOX air cleaner housing. Panel 11 comprises a circular plate 28 having a round outer circumference 12 configured to pass through interior 13 of the intake section of VORTOX air cleaner housing 14. Panel 11 and, in particular, circular plate 28 is approximately 12 inches in diameter with one or more apertures such as first and second apertures 15 and 36 consisting of seven 2.31 inch diameter equally spaced holes on a four inch radius bolt circle. Panel 11 also includes one or more mounting bracket attachment sites such as diametrically opposed mounting bracket attachment sites 40 and 42. Each attachment site is a 7/32 inch square hole positioned approximately 2½ inches from a vertical center line of the panel and 4.330 inches from a horizontal center line of the panel. Panel 11 is formed from a blank 14 inch by 14 inch 18 gauge 430 B. A. stainless steel sheet.

FIG. 5 depicts a pictorial view of mounting bracket 17 of illumination fixture 10 of FIG. 3 for a 15 inch VORTOX air cleaner housing. The mounting bracket is formed from a blank 1½ inch by 4½ inch 18-gauge 430 B. A. stainless steel sheet with the ends thereof having a ¾ inch radius. Mounting bracket 17 includes panel attachment site 18 for attachment to panel 11 and intake section attachment site 19 for attachment to intake section screen 20. Panel attachment site 18 is a 7/32 inch by ½ inch elongated aperture 33 centered in the bracket and approximately 0.562 inches from one end of the bracket. Elongated aperture 33 allows for variations in the manufacture of the air cleaner housing. Intake section attachment site 19 is a 0.187 inch diameter hole centered in the panel and approximately ¼ inch from the other end of the bracket. Bend 21 is formed in the bracket 1.5 inches from the intake section attachment site end of the bracket. The short end of the bracket is bent down 90° forming a bend angle 30 of approximately 90°.

Returning the reader's attention to FIG. 3, each of four mounting brackets 17 is attached to panel 11 with a 3/16 inch by ½ inch stainless steel carriage bolt 45, nut 46, flat washer 47, and lock washer 48. One or more illumination sources such as first and second illumination sources 16 and 37 of, for example, commercially available 12-volt beehive lights are positioned in first and second apertures 15 and 36, respectively. The panel with the lights is inserted through the bottom end of air intake section screen 20. The assembled panel, sources of illumination, and mounting brackets are positioned in top end cap 23 and attached to air intake screen 20 with four #8 by ⅝ inch panhead machine screws 50, nuts 51, and external lockwashers 52. As positioned in the air intake section of the housing, first and second illumination sources 16 and 37 are recessed in top end cap 23 so as to be barely visible through screen 20. This particular mounting configuration allows the light to be cast in a downward direction and provide the desired glowing light effect. The embodiment shown in FIG. 3 is also not only available for a 15 inch VORTOX air cleaner housing, but also for mounting in the cylindrically-shaped 15 inch Farr, PETERBILT; and Kenworth air cleaner housings.

Figure 6:
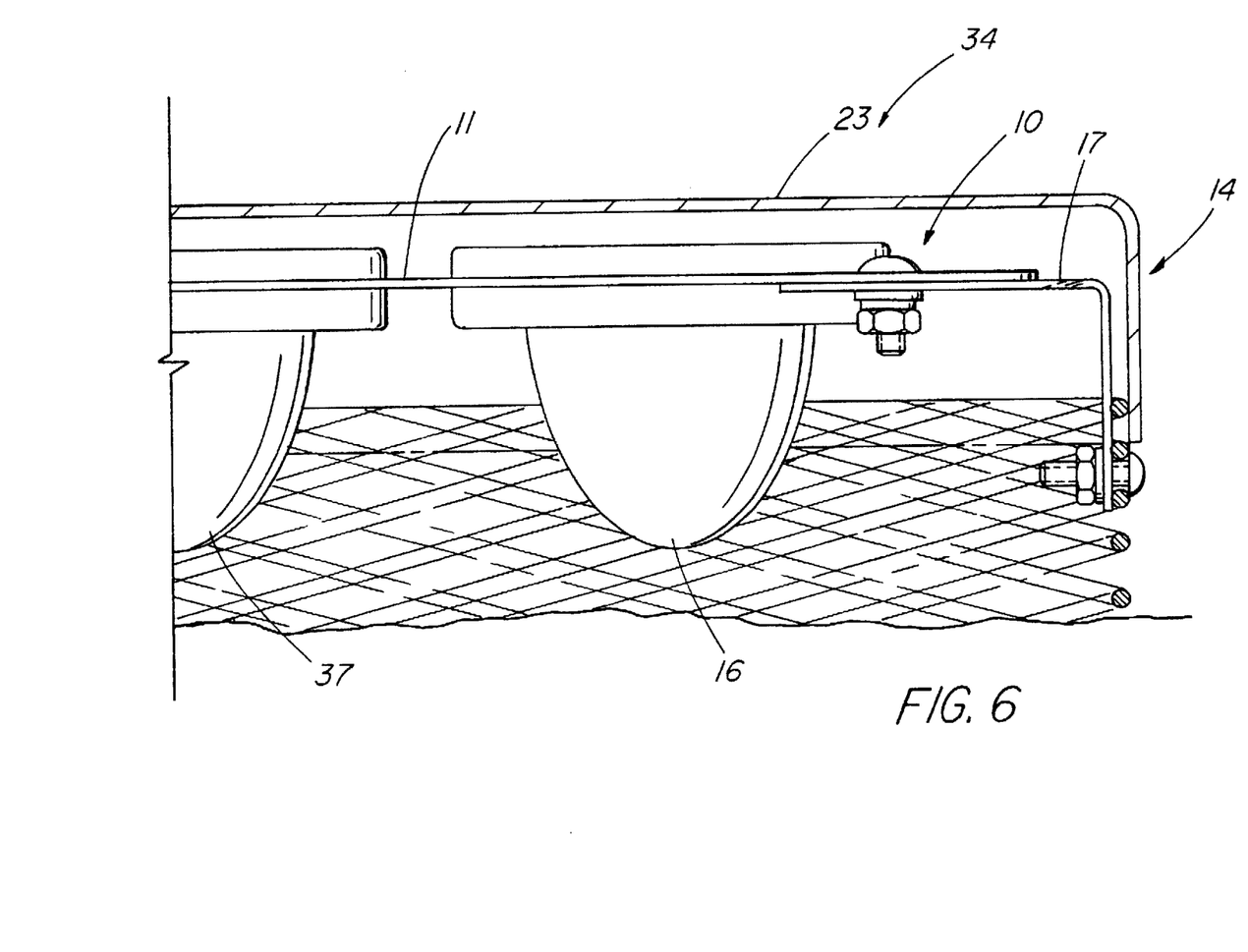
FIG. 6 depicts a partially sectioned and enlarged side view of a second preferred embodiment of the present invention of FIG. 1 for a 13 inch PETERBILT after market VORTOX style vehicular air cleaner.

FIG. 6 depicts a partially sectioned and enlarged side view of a second preferred embodiment of vehicular air cleaner illumination system 34 of FIG. 1 for a 13 inch PETERBILT after market VORTOX style air cleaner housing 14. This particular air cleaner housing is very similar to the 15 inch VORTOX air cleaner housing and also has a cylindrical construction but with an approximately 13 inch outside diameter. Panel 11 depicted in FIG. 4 and previously described is also used in this second embodiment. However, another configuration of mounting bracket 17 is used for this second embodiment.

FIG. 7 depicts a pictorial view of mounting bracket 17 of illumination fixture 10 of FIG. 6 for a 13 inch PETERBILT after market VORTOX style air cleaner housing. The mounting bracket is formed from a blank 1½ inch by 4½ inch 18 gauge 430 B. A. stainless steel sheet with panel attachment site 18 and intake section attachment site 19 formed therein. Attachment site 18 includes elongated aperture 33, which is a 7/32 inch by ⅝ inch slot. This slot is centered in the longitudinal direction approximately ¾ inch from one end of the bracket. Intake section attachment site 19 is a 0.250 inch diameter hole centered in the bracket 0.25 inches from the other end thereof. The bracket is bent as shown to form bend 21 with a bend angle 30 of approximately 90°. As depicted in FIG. 6, vehicular air cleaner illumination fixture 10 including panel 11 of FIG. 4, illumination sources 16 and 37, and mounting bracket 17 of FIG. 7 is positioned as previously described in top end cap 23.

Figure 8:
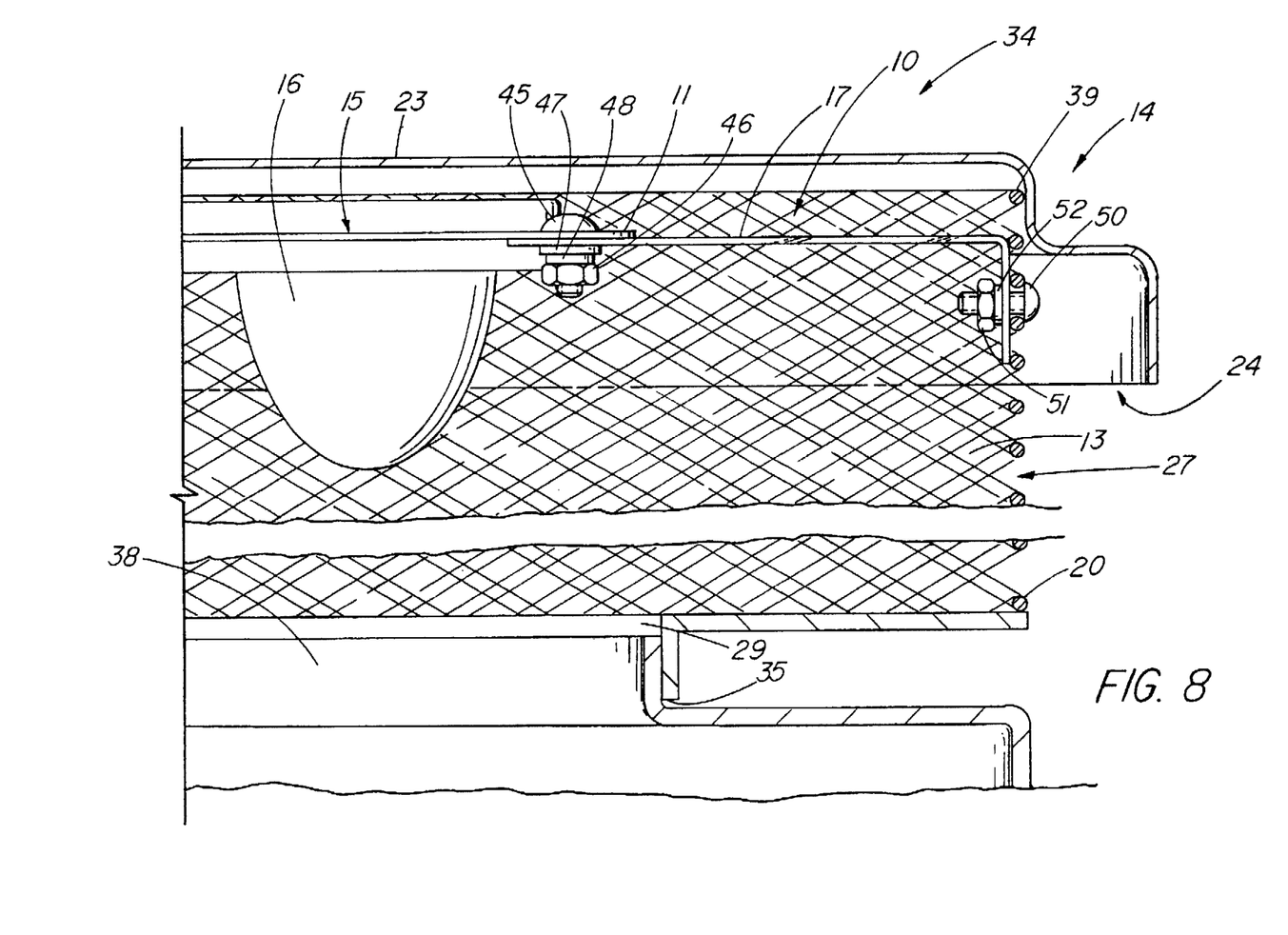
FIG. 8 depicts a partially sectioned and enlarged side view of a third preferred embodiment of the present invention of FIG. 1 for a 13 inch DONALDSON vehicular air cleaner.

FIG. 8 depicts a partially sectioned and enlarged side view of a third preferred embodiment of vehicular air cleaner illumination system 34 of FIG. 1 for a DONALDSON air cleaner having a cylindrical configuration with an approximately 13 inch outside diameter. Housing 14 of the DONALDSON air cleaner has a generally cylindrical configuration; however, bottom end 35 of intake section 27 is necked down resulting in small opening 29 which mates with air intake port 38 of the lower portion of housing 14. Intake section screen 20 however has a generally uniform diameter throughout the height of interior 13 of the intake section. Top end cap 23 of the air intake section is closed at the top end and has bottom open end 24. The top end cap is generally cylindrical in shape with a square shoulder flaring out at bottom open end 24. Top end 39 of intake screen 20 is attached to the smaller internal diameter of top end cap 23. Illumination fixture 10 again includes panel 11 of a generally circular plate configured to pass through interior 13 of the intake section. Panel 11 has an outer diameter approximating small opening 29 at bottom end 35 of the intake section. As a result, the length of mounting brackets 17 is increased to affix panel 11 to air intake screen 20.

Figures 9, 10, 12, 14, 15:
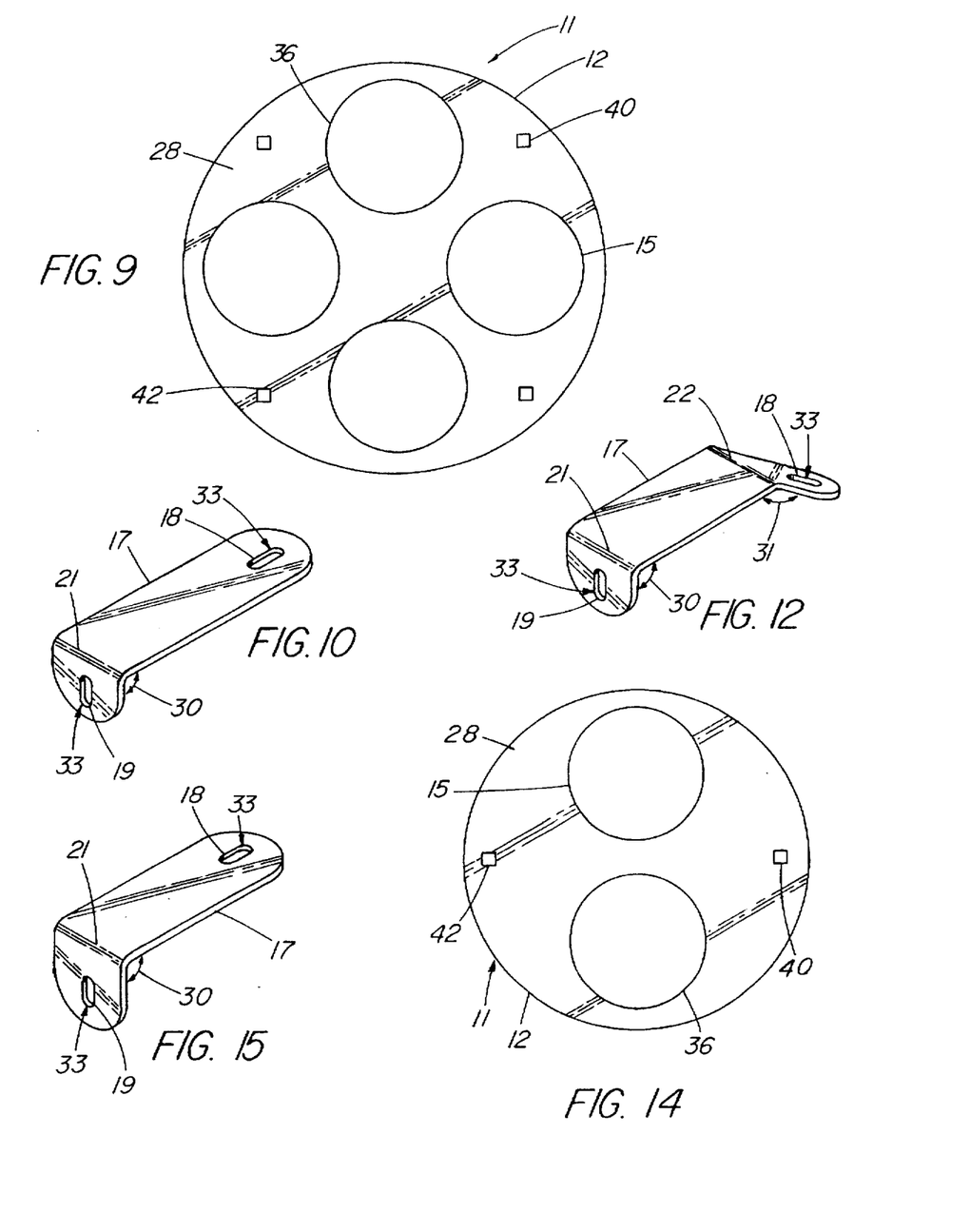
FIG. 9 depicts a top view of the panel of the present invention for the third embodiment of FIG. 8.
FIG. 10 depicts a pictorial view of the mounting bracket of the present invention for the third embodiment of FIG. 8.
FIG. 12 depicts a pictorial view of the mounting bracket for the fourth preferred embodiment of the present invention of FIG. 11.
FIG. 14 depicts a top view of panel for the fifth preferred embodiment of the present invention of FIG. 13.
FIG. 15 depicts a pictorial view of a mounting bracket for the fifth preferred embodiment of the present invention of FIG. 13.

FIG. 9 depicts a top view of panel 11 of illumination fixture 10 of FIG. 8 for the DONALDSON air cleaner. Panel 11 comprises a circular plate 28 with round circumference 12. Panel 11 is approximately 7 inches in diameter to accommodate placement through small opening 29 at bottom end 35 of air intake section 27. Panel 11 includes one or more apertures such as first and second apertures 15 and 36 formed therein. For this third embodiment, four approximately 2.312 inch diameter equally spaced holes on a 2 inch radius bolt circle are formed in panel 11. The panel also includes one or more mounting bracket attachment sites such as first and second diametrically opposed attachment sites 40 and 42. The attachment sites consist of four 7/32 inch square holes equally spaced on a 3 inch radius bolt circle.

FIG. 10 depicts a pictorial view of mounting bracket 17 of illumination fixture 10 of FIG. 8 for the DONALDSON air cleaner. The mounting bracket is formed from a blank 1½ inch by 4⅞ inch 18-gauge 430 B. A. stainless steel sheet with the ends thereof rounded with, for example, a ¾ inch radius. Panel attachment site 18 and intake section attachment site 19 are 7/32 inch by ½ inch elongated apertures 33 centered longitudinally on the bracket approximately 0.5 inches from both ends of the bracket. Bend 21 is formed in the bracket, 1 inch from the intake attachment site end. Bend 21 includes a bend angle 30 of approximately 90°. One or more illumination sources such as first and second beehive lights 16 and 37 are positioned in first and second apertures 15 and 36 of panel 11 and passed through small opening 29 at bottom end 35 of intake section 27 and then through interior 13 thereof. Four mounting brackets 17 are attached to panel 11 with carriage bolts 45, nuts 46, flat washers 47, and lock washers 48, as partially depicted in FIG. 8. Each bracket 17 is mounted near top end 39 of intake section screen 20 using, for example, panhead screw 50, nut 51, and washer 52. As a result, illumination fixture 10 is recessed in top end cap 23 to produce a glowing light effect and minimize the direct glaring light of illumination sources 16.

Figure 11:
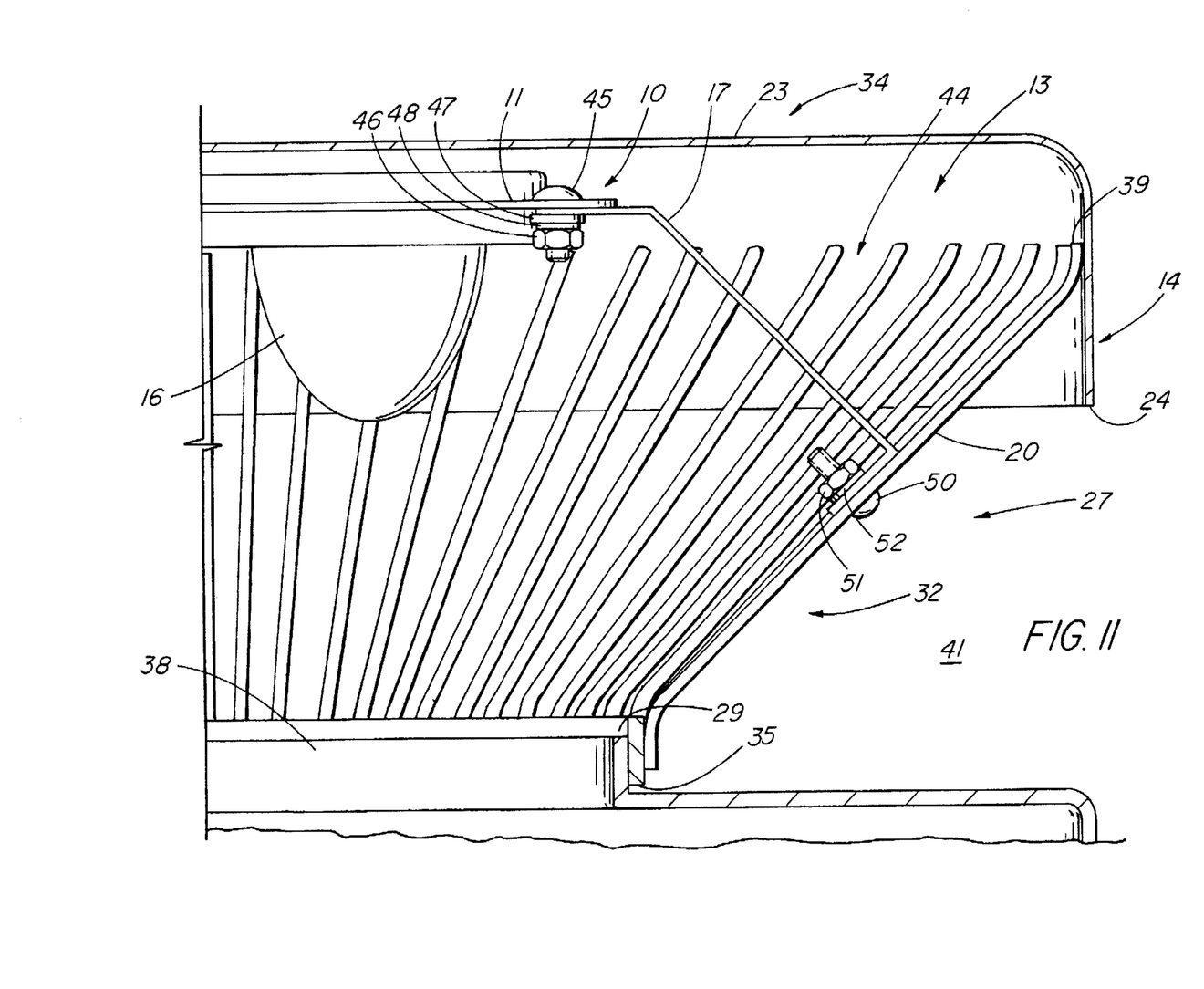
FIG. 11 depicts a partially sectioned and enlarged side view of a fourth preferred embodiment of the present invention of FIG. 1 of a 13 inch VORTOX air cleaner having a tapered intake section.

FIG. 11 depicts a partially sectioned and enlarged side view of a fourth preferred embodiment of illumination system 34 of FIG. 1 for a second variation of a 13 inch VORTOX air cleaner. This second variation of a 13 inch VORTOX air cleaner includes an air cleaner housing 14 with a generally cylindrical configuration; however, air intake section 27 is tapered from top end 39 down to bottom end 35 with small opening 29 thereat. Small opening 29 is much smaller in diameter than opening 44 at top end 39 of the air intake section. Top end cap 23 is of a generally cylindrical configuration with a uniform diameter therealong and having a closed top end and an open bottom end 24. Top end 39 of air intake screen 20 is fixedly attached to the interior of the top end cap approximately two thirds of the way up from open bottom end 24. Since bottom end opening 29 of the intake section is much smaller than that of top end opening 44, panel 11 of illumination fixture 10 is much smaller in diameter than that of interior 13 of the top end cap as well as top end opening 44 of air intake screen 20. Panel 11 for the fourth embodiment of illumination fixture 10 is depicted in FIG. 9.

FIG. 12 depicts a pictorial view of mounting bracket 17 for illumination fixture 10 of FIG. 11 for the second variation of the VORTOX air cleaner. Mounting bracket 17 for this fourth preferred embodiment of illumination fixture 10 is formed from a blank 1½ inch by 4⅞ inch 18 gauge 430 B. A. stainless steel sheet with the ends thereof rounded with, for example, a ¾ inch radius. Elongated apertures 33 form panel attachment site 18 and intake section attachment site 19 and are approximately 7/32 inches wide by ½ inch long, longitudinally centered on the bracket, and centered approximately ½ inch from both ends. First bend 21 is formed by bending the end of the bracket about intake section attachment site 19 down approximately 90° to form first bend angle 30 of approximately 90°. To accommodate tapered intake section 27, a second bend 22 is formed in the bracket by bending the other end of the bracket about panel attachment site 18 down approximately 45° to form second bend angle 31 of approximately 135°, which is an odd integer multiple of 45°.

As shown in FIG. 11, panel 11 with lights 16 are inserted through small opening 29 at bottom end 35 of the air intake section and positioned into interior 13 thereof. Four mounting brackets 17 are attached to panel 11 with fasteners 45-48 as previously described. Each of the four mounting brackets are then attached to intake screen 20 using fasteners 50-52 as also previously described. Illumination fixture 10 is now attached to tapered portion 32 of the air intake section. As positioned, illumination fixture 10 is recessed in top end cap 23 to provide the desired glowing light effect and to minimize direct and glaring light from entering the eyes of a viewer.

Figure 13:
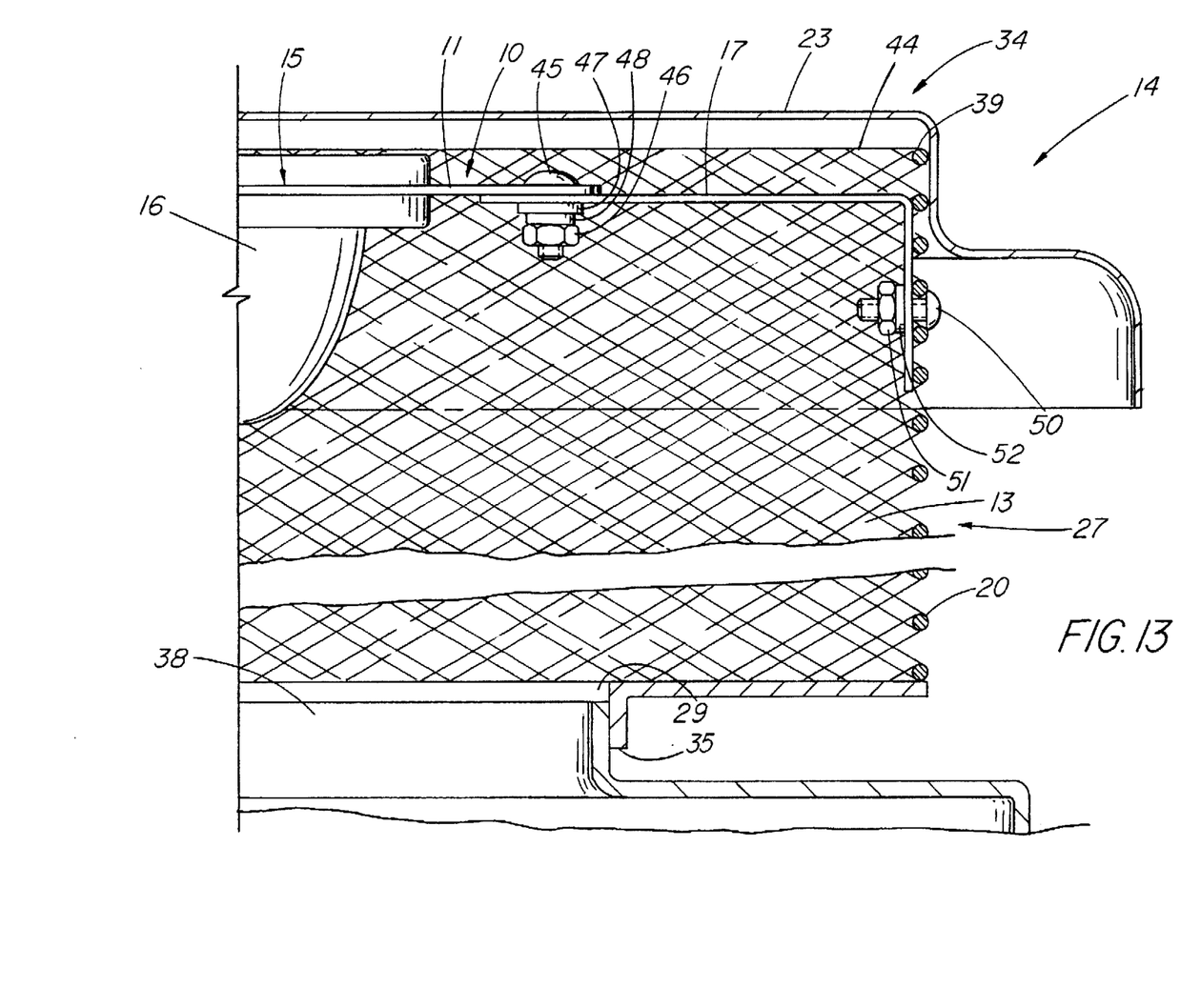
FIG. 13 depicts a partially sectioned and enlarged side view of a fifth preferred embodiment of the present invention of FIG. 1 for a 13 inch NELSON vehicular air cleaner.

FIG. 13 depicts a partially sectioned and enlarged side view of fifth preferred embodiment of vehicular air cleaner illumination system 34 of FIG. 1 for a 13 inch NELSON air cleaner. This air cleaner is very similar in construction to that of the DONALDSON air cleaner described with respect to FIG. 8. However, the outside diameter of the air intake section 27 and screen 20 are smaller in diameter having an outside diameter of approximately 10⅝ inches. Bottom end 35 of the air intake section is necked down and has a small opening 29 that is much smaller in diameter than large opening 44 at top end 39 of air intake screen 20.

FIG. 14 depicts a top view of panel 11 of illumination fixture 10 of FIG. 13 for the 13 inch NELSON air cleaner. Panel 11 comprises a circular plate 28 with round circumference 12 and is formed from a blank 6 inch by 6 inch 20 gauge 430 B. A. stainless steel sheet. One or more apertures such as first and second apertures 15 and 36 are formed therein. These apertures consist of two 2.312 diameter equally spaced holes on a 1.406 inch radius bolt circle. Panel 11 and, in particular, circular plate 28, has a diameter of approximately 5.625 inches. Two 7/32 inch square holes form diametrically opposed first and second mounting bracket attachment sites 40 and 42.

FIG. 15 depicts a pictorial view of mounting bracket 17 for illumination fixture 10 of FIG. 13 for the 13 inch NELSON air cleaner. Mounting bracket 17 is formed from a blank 1½ inch by 4⅞ inch 18 gauge 430 B. A. stainless steel sheet with the ends thereof rounded with a ¾ inch radius. Rounded elongated apertures 33 consisting of a 7/32 inch by ½ inch slot are centered longitudinally on the bracket approximately 0.562 inches from both ends thereof. These rounded elongated apertures form panel attachment site 18 and intake section attachment site 19. Bend 21 is formed in the bracket by bending the sheet down 90° approximately 1½ inches from the end of which intake section attachment site 19 is formed therein. Bend 21 forms bend angle 30 of approximately 90°.

As shown in FIG. 13, two illumination sources 16 and 37 are positioned in first and second apertures 15 and 36 and inserted through small opening 29 at bottom end 35 of air intake section 27 and into interior 13 thereof. Two mounting brackets 17 are attached to panel 11 using fasteners 45-48.

Fasteners 50-52 attach each mounting bracket 17 to intake screen section 20. As positioned, illumination fixture 10 is recessed in top end cap 23 to produce the desired glowing light effect and to minimize glare and direct light from entering the eyes of a viewer.

Figure 16:
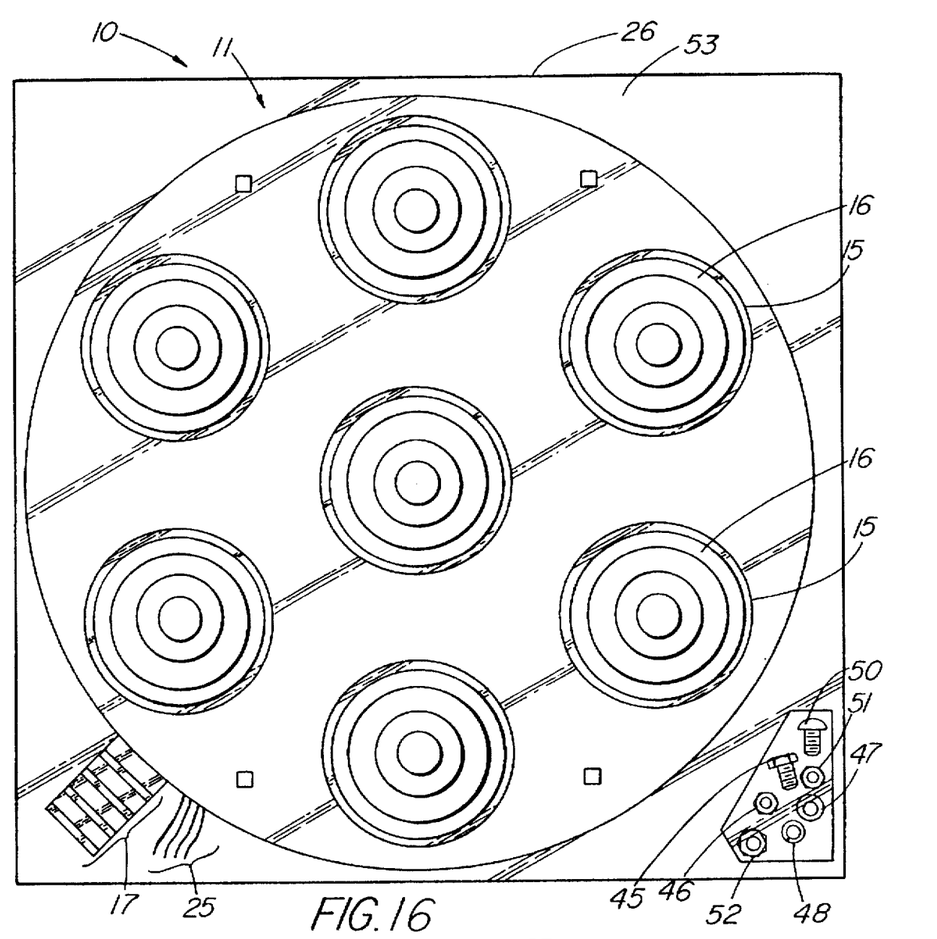
FIG. 16 depicts a package for containing the illumination fixture of the present invention.

FIG. 16 depicts vehicular air cleaner illumination fixture 10 positioned in package 26. The package includes a backing plate typically of corrugated cardboard with panel 11 positioned thereon with illumination sources 16 mounted in apertures 15. One or more mounting brackets 17, preferably four brackets, are also included in the package, along with an appropriate supply of fasteners 45-48 and 50-52 positioned thereon. Power is supplied to the illumination sources via electrical conducting wires 25. All of these components are positioned appropriately on the backing cardboard with a clear plastic shrink wrap 53 positioned thereover to hold the components in place on the cardboard. The illumination fixture is thus readily available to the consumer with all the components in full view in package 26.

It is to be understood that the above-described vehicular air cleaner illumination fixture is merely an illustrative embodiment of the principles of this invention and that numerous other vehicular air cleaner illumination fixtures may be devised by those skilled in the art without departing from the spirit and scope of the invention. In particular, the panel of the illumination fixture has been described as being a circular plate. However, the plate may be of any shape configured to match that of the interior of the intake section of the air cleaner housing. Furthermore, the shape of the panel may be also configured to match that of any small opening at the bottom end of the air intake section. This is to accommodate the shape and configuration of any air intake port. Brackets of the air cleaner illumination fixture may also have one or more bends to accommodate recessing the panel in the top end cap. Different sources and colors of illumination sources can be positioned and configured to produce various lighting effects and to alter the glowing light pattern being emitted from the air intake section of the air cleaner. It is also contemplated that the bends of the mounting brackets may be altered to accommodate various configurations of the air intake section including round, tapered and beveled shapes, again, so as to recess the panel in the top end cap. It is further contemplated that the illumination sources can be positioned on the top side of the panel and the panel mounted in the middle of the intake section to emit upwardly directed light, thus creating other indirect lighting effects. Neon, fluorescent, or other types of illumination can be utilized with the previously described incandescent beehive lights.

What is claimed is:

1. A vehicular air cleaner illumination fixture (10) comprising:

a panel (11) having an outer circumference (12) configured to pass through an interior (13) of an intake section (27) of a vehicular air cleaner housing (14), said panel (11) also including a mounting bracket attachment site (40), and an aperture (15) in which a source of illumination (16) can be positioned; and a mounting bracket (17) having a panel attachment site (18) for attachment to said panel (11) at said mounting bracket attachment site (40) and an intake section attachment site (19) for attachment to the intake section (27), said attachment sites (18, 19, 40), said panel (11), and said mounting bracket (17) being arranged and configured to position said panel (11) in the interior (13) of the intake section (27) so as to illuminate through the intake section (27) an exterior (41) of the housing (14) the source of illumination (16).

2. The fixture of claim 1 wherein said panel (11) comprises a circular plate (28).

3. The fixture of claim 1 further comprising a source of illumination (16) which is positionable in said aperture (15).

4. The fixture of claim 3 wherein said panel (11) includes a second (36) of said aperture (15) and wherein said fixture (10) further comprises a second (37) of said source of illumination (16) which is positionable in said second (36) of said aperture (15).

5. The fixture of claim 1 wherein said mounting bracket (17) includes between said panel attachment site (18) and said intake section attachment site (19) a bend (21) with a bend angle (30) arranged and configured to position said panel (11) in the interior (13) of the intake section (27) so as to illuminate the exterior (41) of the housing (14) with the source of illumination (16).

6. The fixture of claim 1 wherein said mounting bracket (17) includes between said panel attachment site (18) and said intake section attachment site (19) a first bend (21) with a first bend angle (30) and a second bend (22) with a second bend angle (31) arranged and configured to position said panel (11) in the interior (13) of the intake section (27) so as to illuminate the exterior (41) of the housing (14) with the source of illumination (16).

7. The fixture of claim 6 wherein one of said first and said second bend angles (30, 31) is 90°.

8. The fixture of claim 1 wherein said panel (11) further includes a second (42) of said mounting bracket attachment site (40) and wherein said fixture further comprises a second (43) of said mounting bracket (17).

9. The fixture of claim 8 wherein said mounting bracket attachment sites (40, 42) are diametrically positioned on said panel (11).

10. The fixture of claim 1 wherein at least one of said panel (11), said mounting bracket (17), and said intake section attachment sites (18, 40, 19) includes an elongated aperture (33) to adjust said mounting bracket (17) for attachment to said panel (11) and the intake section (27) of the housing (14).

11. A vehicular air cleaner illumination fixture package containing:

a panel (11) having an outer circumference (12) configured to pass through an interior (13) of an intake section (27) of a vehicular air cleaner housing (14), said panel (11) also including a mounting bracket attachment site (40), and an aperture (15) in which a source of illumination (16) can be positioned; and a mounting bracket (17) having a panel attachment site (18) for attachment to said panel (11) at said mounting bracket attachment site (40) and an intake section attachment site (19) for attachment to the intake section (27), said attachment sites (18, 19, 40), said panel (11), and said mounting bracket (17) being arranged and configured to position said panel (11) in the interior (13) of the intake section (27) so as to illuminate through the intake section (27) an exterior (41) of the housing (14) with the source of illumination (16).

12. The fixture of claim 11 further comprising a source of illumination (16) contained in said package (26).

13. A vehicular air cleaner illumination system (34) comprising:

a vehicular air cleaner housing (14) including an intake section (27) having an interior (13) and a screen (20);

a panel (11) with an aperture (15) therein and having an outer circumference (12) configured to pass through said interior (13) of said intake section (27);

a source of illumination (16) disposed in said aperture (15) of said panel (11); and a mounting bracket (17) attached to said panel (11) and said screen (20), wherein said panel (11), said mounting bracket (17), and said source of illumination being arranged and configured to position said panel (11) in said interior (13) of said intake section (27) so as to illuminate through said screen (20) an exterior (41) of said housing with said source of illumination (16).

14. The system of claim 13 wherein said intake section (27) includes an end cap (23) with said screen (20) disposed about an open end (24) of said end cap (23) and wherein said panel (11) is positioned in said end cap (23) and recessed from said open end (24) of said end cap (23).

15. The system of claim 13 wherein said intake section (27) has a small opening (29) at one end (35) and a large opening (44) at an other end (39); wherein said outer circumference (12) of said panel (11) is configured to pass through said small opening (29); and wherein said panel (11) and said mounting bracket (17) are arranged and configured to position said panel (11) in said interior (13) of said intake section (27) at said other end (39) adjacent said large opening (44).

16. The system of claim 15 wherein said screen (20) of said intake section (27) has a tapered portion (32) extending between said small opening (29) at said one end (35) and said large opening (44) at said other end (39); wherein said mounting bracket (17) has a first bend (21) with a first bend angle (30) and a second bend (22) with a second bend angle (31); and wherein at least one of said first and said second bend angles (30, 31) conforms said mounting bracket (17) with said tapered portion (32) of said screen (20).

17. The system of claim 16 wherein one of said first and said second bend angles (30, 31) is an odd integer multiple of 45° and another of said first and said second bend angles (30, 31) is 90°.

18. The system of claim 13 wherein at least one of said panel (11) and said mounting bracket (17) includes an elongated aperture (33) to adjust said mounting bracket (17) for attachment to said panel (11) and said screen (20) of said housing.

19. The system of claim 13 wherein said panel (11) includes a first (40) and a second (42) mounting bracket attachment site that are diametrically positioned on said panel (11) and wherein said fixture further comprises a second (43) of said mounting bracket (17).

20. A vehicular air cleaner illumination system (34), comprising:

an air cleaner housing (14) having an air intake port (38);

an air intake section (27) having an opening (29) disposed around said air intake port (38);

an end cap (23) disposed about another opening (44) of said intake section (27);

a panel (11) having at least one aperture (15) therein and positioned in said end cap (23);

at least one illumination source (16) positioned in said at least one aperture (15) of said panel (11); and at least one bracket (17) attached to said intake section (27) and said panel (11) positioned in said end cap (23).

* * * * *